US009538488B2

(12) United States Patent
Tachikawa

(10) Patent No.: US 9,538,488 B2
(45) Date of Patent: Jan. 3, 2017

(54) COMMUNICATION CONTROL METHOD, NETWORK APPARATUS, AND BASE STATION

(71) Applicant: KYOCERA CORPORATION, Kyoto (JP)

(72) Inventor: Hitoya Tachikawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/031,624

(22) PCT Filed: Oct. 15, 2014

(86) PCT No.: PCT/JP2014/077426
§ 371 (c)(1),
(2) Date: Apr. 22, 2016

(87) PCT Pub. No.: WO2015/060172
PCT Pub. Date: Apr. 30, 2015

(65) Prior Publication Data
US 2016/0242129 A1 Aug. 18, 2016

(30) Foreign Application Priority Data
Oct. 25, 2013 (JP) .................................. 2013-221804

(51) Int. Cl.
H04B 7/00 (2006.01)
H04W 52/38 (2009.01)
(Continued)

(52) U.S. Cl.
CPC ........... *H04W 52/386* (2013.01); *H04W 36/36* (2013.01); *H04W 52/0206* (2013.01); *H04W 52/343* (2013.01); *H04W 52/143* (2013.01)

(58) Field of Classification Search
CPC ...... H04W 52/08; H04W 36/30; H04W 88/08; H04W 52/0206; H04W 84/045; H04W 24/02; H04W 52/343; H04W 52/146; H04W 52/244; H04W 36/0061; H04W 92/20; H04W 52/04; H04W 52/143; H04W 52/34; H04W 52/38
(Continued)

(56) References Cited

U.S. PATENT DOCUMENTS

2011/0319125 A1 12/2011 Nakano
2012/0058796 A1* 3/2012 Miyabayashi ........ H04W 24/04 455/522

FOREIGN PATENT DOCUMENTS

JP 2010-226704 A 10/2010

OTHER PUBLICATIONS

International Search Report issued in PCT/JP2014/077426; mailed Jan. 20, 2015.
(Continued)

Primary Examiner — Keith Ferguson
(74) Attorney, Agent, or Firm — Studebaker & Brackett PC

(57) ABSTRACT

A communication control method is a method in which a neighboring cell #1 supplements a coverage of an OFF target cell #2 by increasing transmission power of the neighboring cell #1, when setting the OFF target cell #2 to an OFF state. The communication control method comprises: a step A of informing, by a UE 100 connected to the OFF target cell #2, the OFF target cell #2 of neighboring cell received power that is received power of a radio signal from the neighboring cell #1; and a step B of deciding, by a server 400 that acquires the neighboring cell received power via the OFF target cell #2, on the basis of the acquired neighboring cell received power, an amount of increase in transmission power of the neighboring cell #1.

9 Claims, 12 Drawing Sheets

(51) Int. Cl.
  *H04W 52/34* (2009.01)
  *H04W 36/36* (2009.01)
  *H04W 52/02* (2009.01)
  *H04W 52/14* (2009.01)

(58) Field of Classification Search
  USPC .......... 455/522, 69, 68, 561, 436–444, 509,
          434,455/500, 517, 550.1, 508, 445, 450,
          452.1,455/422.1, 403, 524, 525, 67.11,
          423–425,455/426.1, 426.2; 370/328, 329,
                          332, 338, 318, 370/343
  See application file for complete search history.

(56) References Cited

OTHER PUBLICATIONS

Written Opinion issued in PCT/JP2014/077426; mailed Jan. 20, 2015.
3rd Generation Partnership Project; Technical Specification Group Radio Access Network; Evolved Universal Terrestrial Radio Access (E-UTRA); Potential solutions for energy saving for E-UTRAN (Release 11); 3GPP TR 36.927; V11.0.0; Sep. 2012; pp. 1-22; 3GPP Organizational Partners.
Mitsubishi Electric; "ES Procedure for Compensation Scenario"; 3GPP TSG RAN WG3 Meeting #74; R3-113027; Nov. 14-18, 2011; pp. 1-4; San Francisco, USA.
CMCC, Samsung,CATT, LGE, NEC, Kyocera; "Discussion on Solutions for LTE coverage layer energy saving"; 3GPP TSG-RAN WG3 Meeting #81; R3-131373; Aug. 19-23, 2013; pp. 1-9; Barcelona, Spain.

* cited by examiner

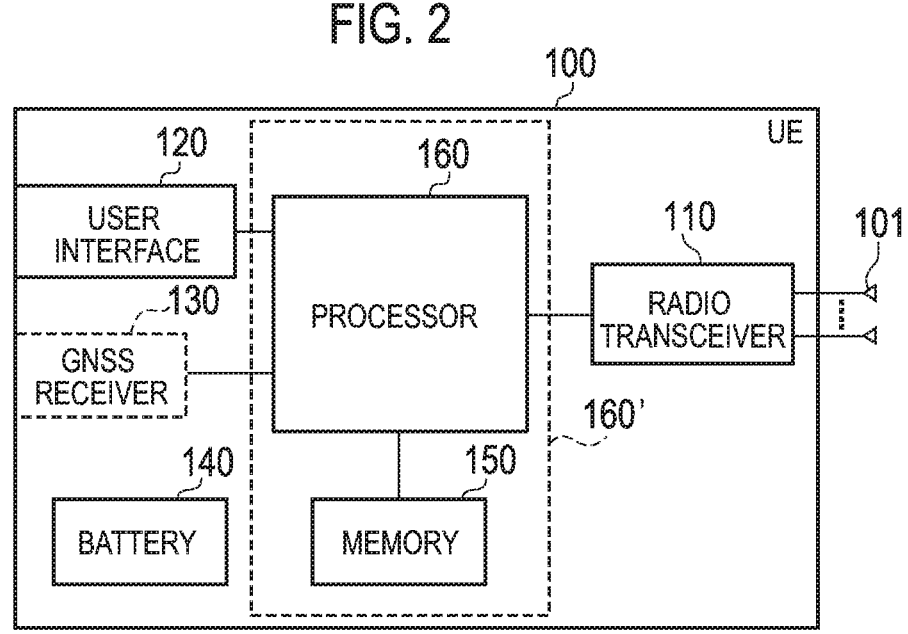
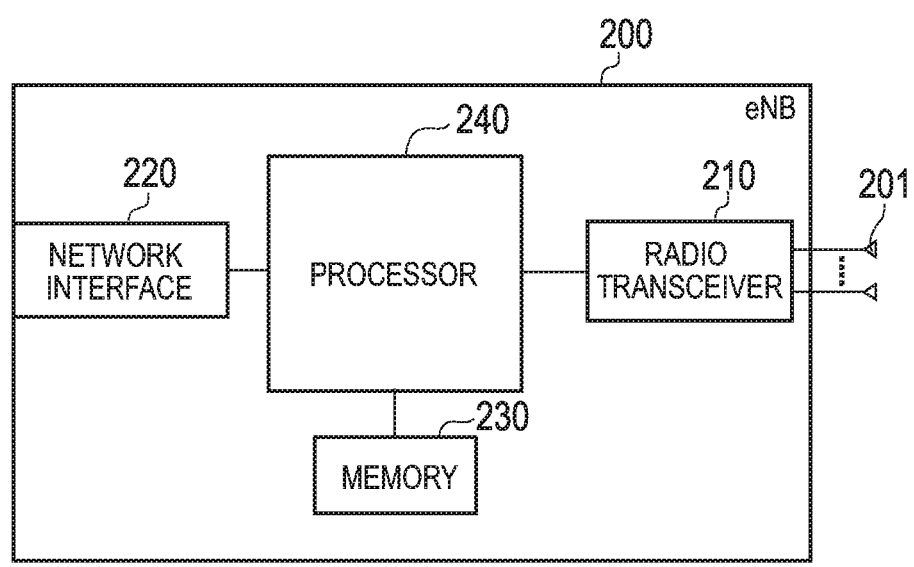

FIG. 11

| TERMINAL (UE) PROVIDED WITH SERVICE | eNB GROUP WHICH EXTENDED CELL OF eNB 200-1 COVERS WITH | | | DETERMINATION |
|---|---|---|---|---|
| | eNB 200-2 MEASUREMENT RESULT (SWITCH OFF TARGET) UNIT: dBm | eNB 200-1 MEASUREMENT RESULT (CELL EXTENSION) UNIT: dBm | eNB 200-3 MEASUREMENT RESULT (SWITCH OFF TARGET) UNIT: dBm | |
| UE-1 | -88 | -150(LOWEST VALUE) | -75 | ○ |
| UE-2 | -100 | -88 | -100 | ○ |
| UE-3 | -110 | -90 | -90 | ○ |
| UE-4 | -78 | -75 | NO MEASUREMENT | ○ |
| UE-5 | -78 | -60 | -200 | ○ |

FIG. 12

| LOWEST VALUE OF UE MEASUREMENT (dBm) | INCREASED TRANSMISSION POWER VALUE (dBm) |
|---|---|
| -150 | 50 |
| -140 | 40 |
| -130 | 30 |
| -120 | 20 |
| -110 | 10 |
| -100 OR ABOVE | 0 |

FIG. 14

| TERMINAL (UE) PROVIDING WITH SERVICE | eNB GROUP WHICH EXTENDED CELL OF eNB 200-1 COVERS WITH | | | eNB OTHER THAN eNB 200-1 HANDLES EXTENDED CELL | |
|---|---|---|---|---|---|
| | eNB 200-2 MEASUREMENT RESULT (SWITCH OFF TARGET) UNIT: dBm | eNB 200-1 MEASUREMENT RESULT (CELL EXTENSION) UNIT: dBm | eNB 200-3 MEASUREMENT RESULT (SWITCH OFF TARGET) UNIT: dB | DETERMINATION | eNB 200-4 MEASUREMENT RESULT (DIFFERENT FREQUENCY FROM THAT OF eNBs 200-1 to 200-3) |
| UE-1 | -88 | -150 | -75 | | -150 |
| UE-2 | -100 | -88 | -100 | ○ | NO MEASUREMENT |
| UE-3 | -110 | -90 | -90 | ○ | NO MEASUREMENT |
| UE-4 | -78 | -75 | NO MEASUREMENT | ○ | NO MEASUREMENT |
| UE-5 | -78 | -200 | -200 | × | -110 |

IT IS NOT POSSIBLE TO SUPPORT BECAUSE OF OUTSIDE OF RANGE

HO INSTRUCTION BECAUSE IT IS POSSIBLE TO CONNECT TO NEIGHBORING eNB

COMMUNICATION CONTROL METHOD, NETWORK APPARATUS, AND BASE STATION

TECHNICAL FIELD

The present invention relates to a communication control method, a network apparatus, and a base station used in a mobile communication system.

BACKGROUND ART

According to 3 GPP (3rd Generation Partnership Project), which is a project aiming to standardize a mobile communication system, a technology for power saving (energy saving), which reduces the power consumption of a network, has been introduced (for example, see Non Patent Document 1). For example, a cell managed by a base station is set to an OFF state (Deactivate) in the nighttime etc. when communication traffic is less.

Furthermore, according to the 3 GPP, in Release 12 and later, an improved energy saving technology is proposed to be introduced. For example, when setting one cell to an OFF state, transmission power of a neighboring cell is caused to be increased. As a result, it is possible to extend a coverage of a neighboring cell such that the neighboring cell supplements a coverage of a cell that is set to an OFF state (hereinafter, called as "OFF target cell").

PRIOR ART DOCUMENT

Non-Patent Document

Non Patent Document 1: 3 GPP technical report "TR 36.927 V11.0.0" September, 2012

SUMMARY OF THE INVENTION

In the above-described method of extending a cell coverage, when an amount of increase in transmission power of a neighboring cell is not appropriate, it is not possible to necessarily include all of the user terminals connected to an OFF target cell into a coverage of the neighboring cell. Consequently, there is a problem that communication interruption may occur in the user terminal.

Therefore, an object of the present invention is to provide a communication control method, a network apparatus, and a base station by which a neighboring cell is capable of appropriately supplementing a coverage of an OFF target cell.

A communication control method according to a first aspect is a method in which a neighboring cell supplements a coverage of an OFF target cell by increasing transmission power of the neighboring cell, when setting the OFF target cell to an OFF state. The communication comprises: a step A of acquiring, by a network apparatus, from a user terminal connected to the OFF target cell, neighboring cell received power that is received power of a radio signal from the neighboring cell; and a step B of deciding, by the network apparatus, on the basis of the neighboring cell received power, an amount of increase in transmission power of the neighboring cell.

A network apparatus according to a second aspect is an apparatus in which a neighboring cell supplements a coverage of an OFF target cell by increasing transmission power of the neighboring cell, when setting the OFF target cell to an OFF state. The network apparatus acquires neighboring cell received power notified from a user terminal connected to the OFF target cell via the OFF target cell, and decides an amount of increase in transmission power of the neighboring cell on the basis of the acquired neighboring cell received power.

A base station according to a second aspect is a base station of which transmission power is allowed to increase. An increase in the transmission power is based on neighboring cell received power of a user terminal connected to a cell other than a cell managed by the base station. The neighboring cell received power includes received power of a radio signal from a cell managed by the base station.

BRIEF DESCRIPTION OF THE DRAWINGS

FIG. 2 is a block diagram of a UE according to the embodiment.

FIG. 3 is a block diagram of an eNB according to the embodiment.

FIG. 11 is a diagram (part 1) for describing contents of processing in the server according to the embodiment.

FIG. 12 is a diagram (part 2) for describing contents of processing in the server according to the embodiment.

FIG. 14 is a diagram for describing a modification of the embodiment.

DESCRIPTION OF THE EMBODIMENT

Overview of Embodiment

Figure 1:
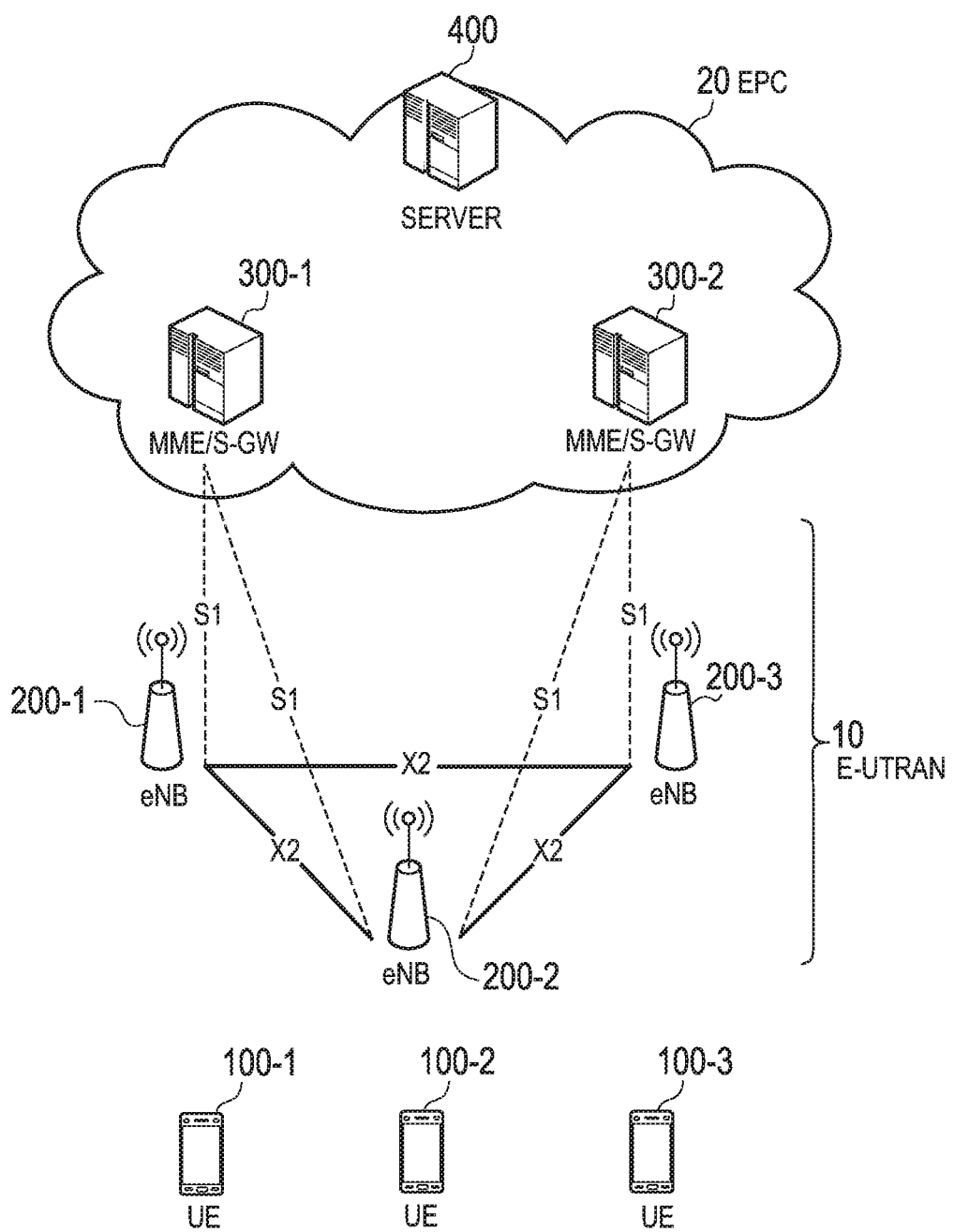
FIG. 1 is a configuration diagram of an LTE system according to an embodiment.

A communication control method according to an embodiment is a method in which a neighboring cell supplements a coverage of an OFF target cell by increasing transmission power of the neighboring cell, when setting the OFF target cell to an OFF state. The communication comprises: a step A of acquiring, by a network apparatus, from a user terminal connected to the OFF target cell, neighboring cell received power that is received power of a radio signal from the neighboring cell; and a step B of deciding, by the network apparatus, on the basis of the neighboring cell received power, an amount of increase in transmission power of the neighboring cell.

In the embodiment, when a plurality of user terminals connect to the OFF target cell, in the step A, the network apparatus acquires the neighboring cell received power from each of the plurality of user terminals, and in the step B, the network apparatus decides, on the basis of the neighboring cell received power acquired for each of the plurality of user terminals, an amount of increase in transmission power of the neighboring cell such that all of the plurality of user terminals are included into a coverage of the neighboring cell.

In the embodiment, the neighboring cell is managed by a first base station. The OFF target cell is managed by a second base station. The network apparatus is a server that is capable of performing communication with the first base station and the second base station.

In the embodiment, the communication control method further comprises the steps of: notifying, by the network apparatus, the first base station of power control information indicating the decided amount of increase in transmission power of the neighboring cell; and increasing, by the first base station that has received the power control information, transmission power of the neighboring cell on the basis of the received power control information.

In the embodiment, the communication control method further comprises the steps of: notifying, by the network apparatus, the first base station of information indicating a power up time that is the time at which the neighboring cell is to increase transmission power; and notifying, by the network apparatus, the second base station of information indicating an OFF time that is the time at which the OFF target cell is to be set to an OFF state.

In the embodiment, the OFF target cell and the neighboring cell belong to the same frequency. The power up time and the OFF time are set to approximately the same time.

In the embodiment, the communication control method further comprises the steps of: increasing, by the first base station, transmission power of the neighboring cell at the power up time; setting, by the second base station, the OFF target cell to an OFF state at the OFF time; and performing, by the user terminal connected to the OFF target cell, handover from the OFF target cell to the neighboring cell.

A network apparatus according to the embodiment is an apparatus in which a neighboring cell supplements a coverage of an OFF target cell by increasing transmission power of the neighboring cell, when setting the OFF target cell to an OFF state. The network apparatus comprises: a controller configured to acquire neighboring cell received power notified from a user terminal connected to the OFF target cell via the OFF target cell. The controller decides an amount of increase in transmission power of the neighboring cell on the basis of the acquired neighboring cell received power.

Embodiment

Hereinafter, a description will be provided for an embodiment when the present invention is applied to an LTE system.

(System Configuration)

FIG. 1 is a configuration diagram of the LTE system according to the embodiment. As illustrated in FIG. 1, the LTE system according to the embodiment includes a plurality of UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile communication device and performs radio communication with a cell (a serving cell). A configuration of the UE 100 will be described later.

The E-UTRAN 10 corresponds to a radio access network. The E-UTRAN 10 includes eNBs 200 (evolved Node-Bs). The eNB 200 corresponds to a base station. The eNB 200 corresponds to the base station. The eNBs 200 are connected mutually via an X2 interface. A configuration of the eNB 200 will be described later.

The eNB 200 manages a cell or a plurality of cells and performs radio communication with UE 100 established a connection with the own cell. The eNB 200, for example, has a radio resource management (RRM) function, a routing function of user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. The E-UTRAN 10 and the EPC 20 constitute a network of the LTE system. The EPC 20 includes MMEs (Mobility Management Entities)/S-GWs (Serving-Gateways) 300. The MME is a network node for performing various mobility controls, for example, for the UE 100. The SGW performs transfer control of user data. The MME/S-GW 300 is connected to the eNBs 200 via an S1 interface.

The EPC 20 includes a server 400. The server 400 is an operation and maintenance server managed by an operator. A configuration of the server 400 will be described later.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 corresponds to storage. The processor 160 (and the memory 150) constitutes a controller. The UE 100 may not have the GNSS receiver 130. Furthermore, the memory 150 may be integrally formed with the processor 160, and this set (that is, a chipset) may be called a processor 160'.

The plurality of antennas 101 and the radio transceiver 110 are used to transmit and receive a radio signal. The radio transceiver 110 converts a baseband signal (transmission signal) output from the processor 160 into the radio signal, and transmits the radio signal from the plurality of antennas 101. Furthermore, the radio transceiver 110 converts the radio signal received by the plurality of antennas 101 into the baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 corresponds to storage. The processor 240 (and the memory 230) constitutes a controller.

The plurality of antennas 201 and the radio transceiver 210 are used to transmit and receive a radio signal. The radio transceiver 210 converts the baseband signal (transmission signal) output from the processor 240 into the radio signal, and transmits the radio signal from the plurality of antennas 201. Furthermore, the radio transceiver 210 converts the radio signal received by the plurality of antennas 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
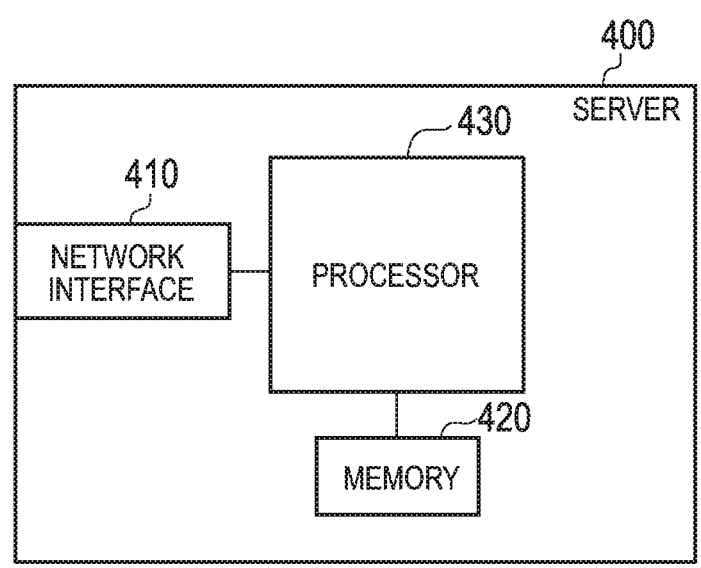
FIG. 4 is a block diagram of a server according to the embodiment.

FIG. 4 is a block diagram of the server 400. As illustrated in FIG. 3, the server 400 includes a network interface 410, a memory 420, and a processor 430. The memory 420 corresponds to storage. The processor 430 (and the memory 420) constitutes a controller.

The network interface 410 is used in communication with the eNB 200. The memory 420 stores a program to be executed by the processor 430 and information to be used for a process by the processor 430. The processor 430 performs various processes by executing the program stored in the memory 420. The processor 430 implements various processes and various communication protocols described later.

Figure 5:
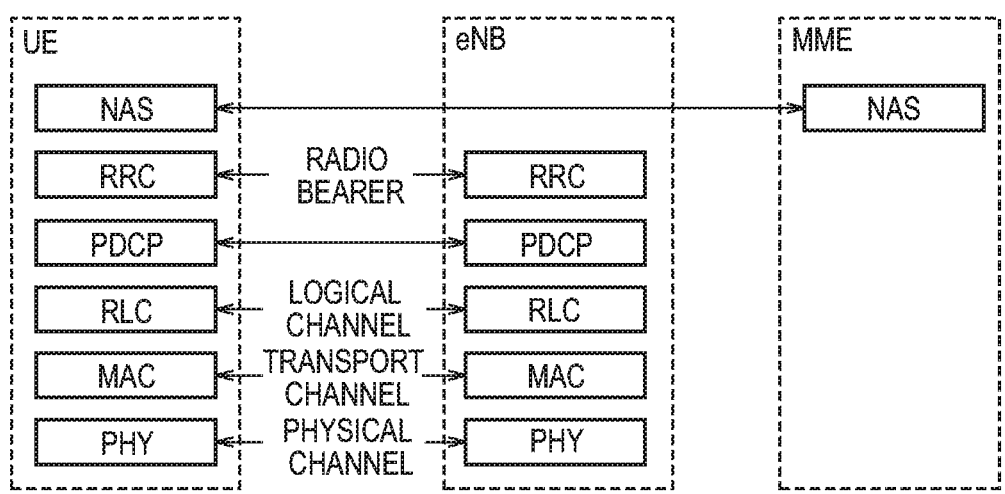
FIG. 5 is a protocol stack diagram of a radio interface according to the embodiment.

FIG. 5 is a protocol stack diagram of a radio interface in the LTE system. As illustrated in FIG. 5, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs preferential control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a scheduler for determining a transport format (a transport block size, a modulation and coding scheme) of an uplink and a downlink, and an assignment resource block to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is a connection (an RRC connection) between the RRC of the UE 100 and the RRC of the eNB 200, the UE 100 is in a connected state (RRC Connected State), and otherwise, the UE 100 is in an idle state (RRC Idle State).

A NAS (Non-Access Stratum) layer positioned above the RRC layer performs session management or mobility management, for example.

Figure 6:
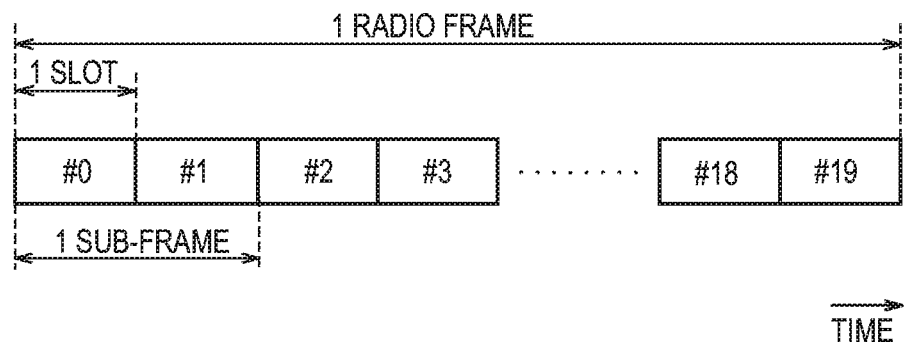
FIG. 6 is a configuration diagram of a radio frame according to the embodiment.

FIG. 6 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 6, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol.

Among radio resources assigned to the UE 100, a frequency resource is constituted by a resource block and a time resource is constituted by a subframe (or slot).

In the downlink, an interval of several symbols at the head of each subframe is a region mainly used as a physical downlink control channel (PDCCH) to transmit a control signal. Furthermore, the remaining portion of each subframe is a region mainly used as a physical downlink shared channel (PDSCH) to transmit user data. Moreover, reference signals (RSs) such as cell-specific reference signals are distributed and arranged.

In the uplink, both end portions, in the frequency direction, of each subframe are regions mainly used as a physical uplink control channel (PUCCH) to transmit a control signal. Furthermore, the remaining portion, in the frequency direction, of each subframe is a region mainly used as a physical uplink shared channel (PUSCH) to transit use data.

(Communication Control Method According to Embodiment)

The communication control method according to the embodiment relates to an improved energy saving technology. For example, when one cell is set to an OFF state, transmission power of a neighboring cell is caused to be increased. As a result, a coverage of the neighboring cell is extended such that the neighboring cell supplements a coverage of the cell that is set to the OFF state (OFF target cell).

Figure 7:
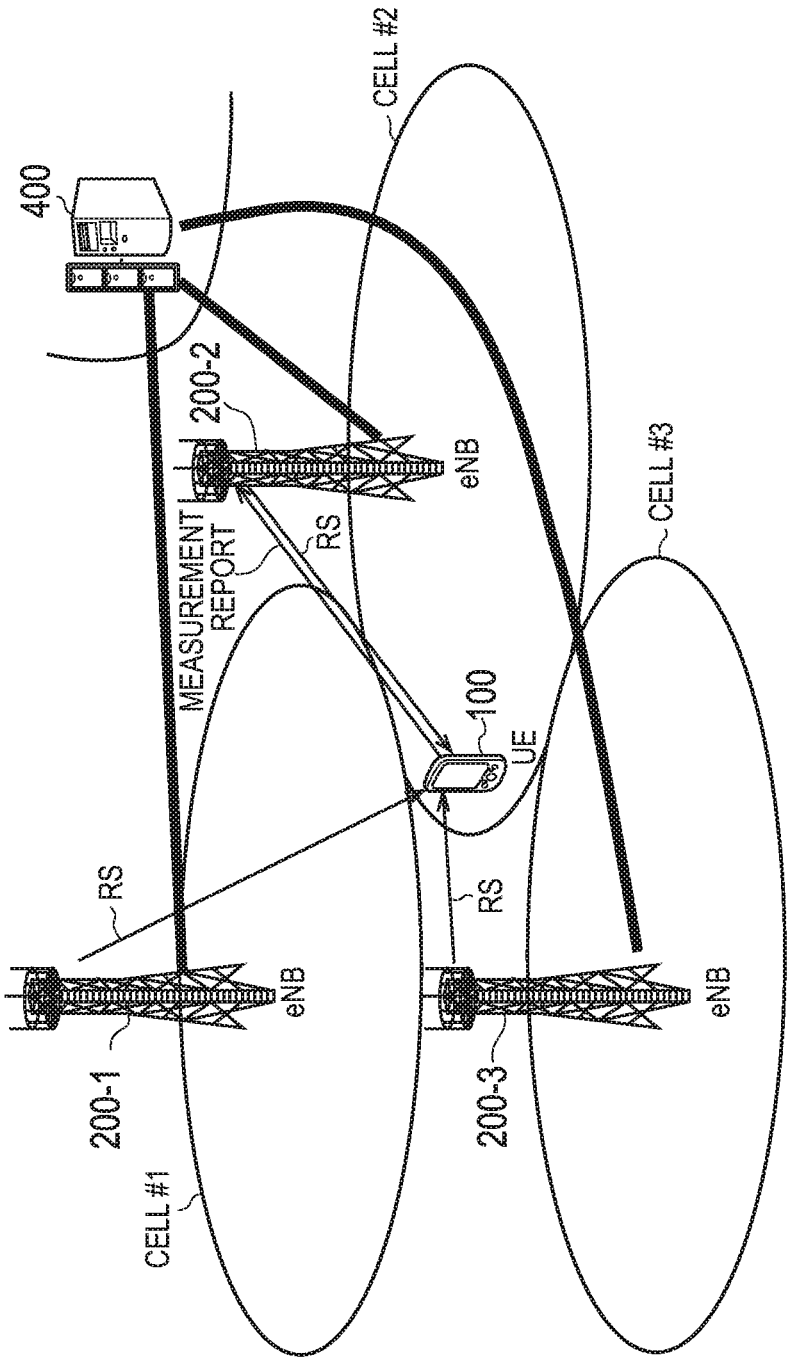
FIG. 7 is a diagram showing an operation environment according to the embodiment.
Figure 8:
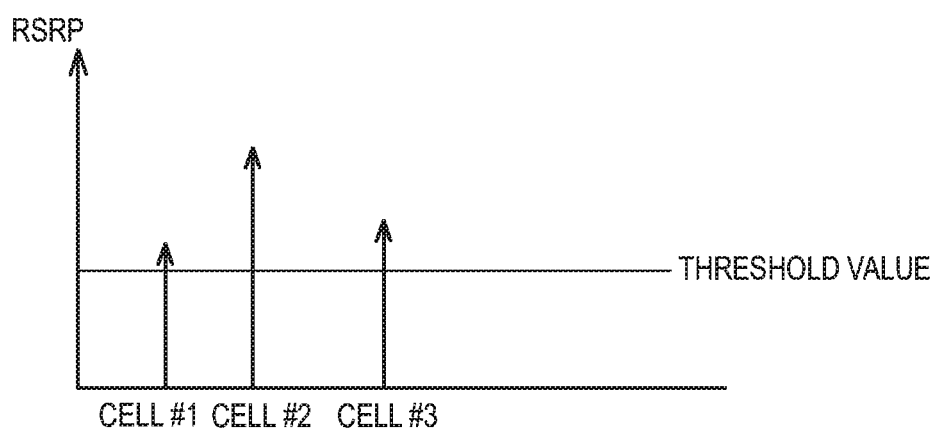
FIG. 8 is a diagram for describing an overview of processing of the server according to the embodiment.
Figure 9:
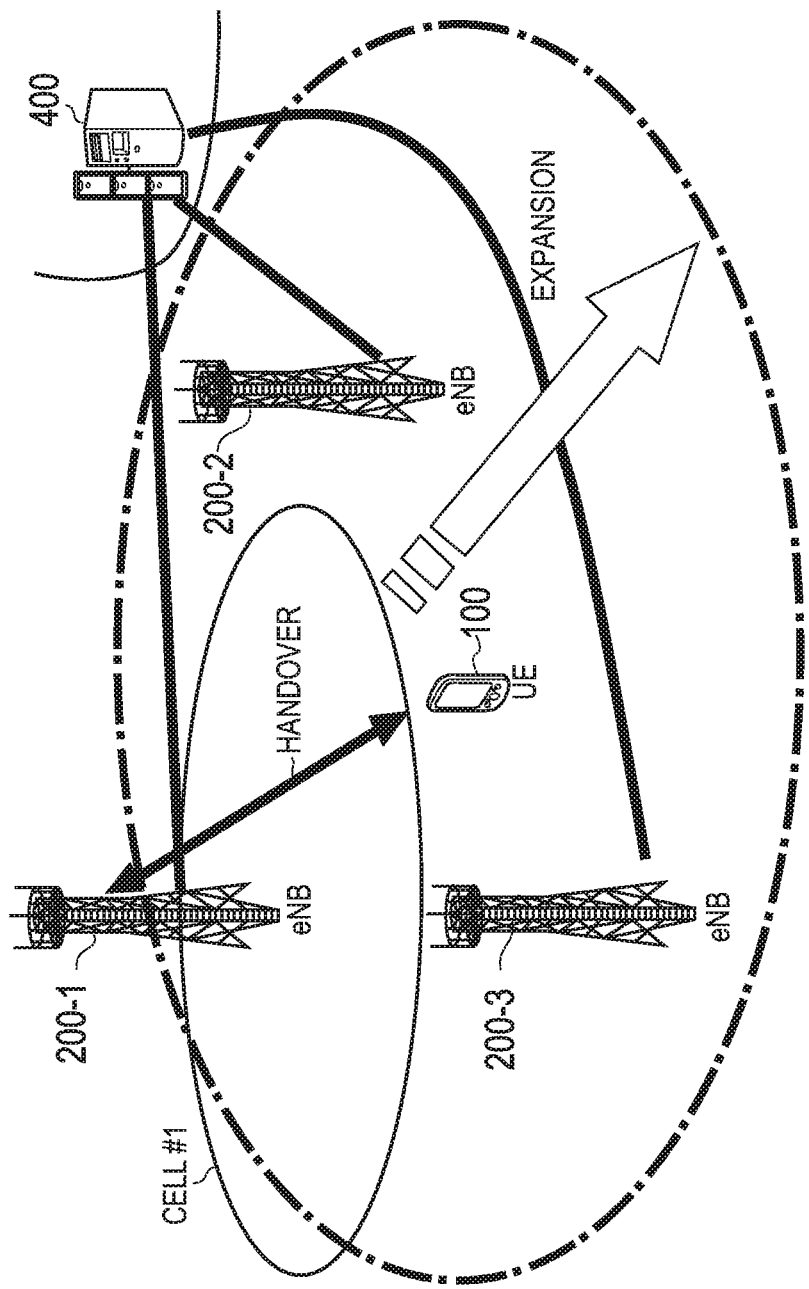
FIG. 9 is a diagram for describing an operation of cell extension according to the embodiment.

The communication control method according to the embodiment will be described with reference to FIG. 7 to FIG. 9. FIG. 7 is a diagram showing an operation environment according to the embodiment. FIG. 8 is a diagram for describing an overview of processing of the server 400 according to the embodiment. FIG. 9 is a diagram for describing an operation of cell extension according to the embodiment.

As shown in FIG. 7, an operation environment is assumed in which a cell #1 to a cell #3 are arranged adjacent to each other and different eNBs 200 (eNBs 200-1 to 200-3) manage the cell #1 to cell #3. The cell #1 to the cell #3 belong to the same frequency. The UE 100 is connected to the cell #1.

Furthermore, the cell #2 and the cell #3 are OFF target cells, and the cell #1 is a neighboring cell. Hereinafter, description is based primarily on the cell #2 among from the OFF target cells (cell #2 and cell #3).

The server 400 is capable of performing communication with the eNB 200-1 to 200-3. The server 400 corresponds to a network apparatus in which a neighboring cell #1 supplements a coverage of the OFF target cell #2 by increasing transmission power of the neighboring cell #1, when setting the OFF target cell #2 to the OFF state.

The communication control method according to the embodiment comprises a step A of notifying, by the UE 100 connected to the OFF target cell #2, the OFF target cell #2 of neighboring cell received power that is received power of a radio signal from the neighboring cell #1. The neighboring cell received power is reference signal received power (RSRP), for example. Such notification of the RSRP is referred to as a measurement report. The measurement report of the UE 100 may include not only the neighboring cell received power but also received power of a serving cell (that is, cell #2).

The server 400 acquires the neighboring cell received power (measurement report) via the OFF target cell #2. The communication control method according to the embodiment comprises a step B of deciding, by the server 400, on the basis of the acquired neighboring cell received power, an amount of increase in transmission power of the neighboring cell #1. As described above, by deciding the amount of increase in transmission power of the neighboring cell #1 in consideration of reception state of the UE 100 connected to the OFF target cell #2, it is possible to set the amount of increase in transmission power of the neighboring cell #1 to an appropriate value. Thus, the neighboring cell #1 is capable of appropriately supplementing the coverage of the OFF target cell #2. It is noted that "transmission power of the neighboring cell #1" primarily refers to transmission power of a broadcast signal transmitted by the neighboring cell #1. The broadcast signal includes a reference signal, a synchronization signal, system information, etc.

In the embodiment, when a plurality of UEs 100 connect to the OFF target cell #2, in the step A, each of the plurality of UEs 100 notifies the OFF target cell #2 of the neighboring cell received power. In the step B, the server 400 decides, on the basis of the neighboring cell received power acquired for each of the plurality of UEs 100, the amount of increase in transmission power of the neighboring cell #1 such that all of the plurality of UEs 100 are included into the coverage of the neighboring cell #1. As a result, it is possible to include all of the UEs 100 connected to the OFF target cell #2 into the coverage of the neighboring cell #1.

As shown in FIG. 8, the server 400 decides, on the basis of the RSRP of the neighboring cell #1 among from the measurement report from the UE 100 connected to the OFF target cell #2, the amount of increase in transmission power of the neighboring cell #1. Specific example of processing for deciding the amount of increase in transmission power will be described later. Furthermore, the server 400 may determine, on the basis of the RSRP of the neighboring cell #1, whether or not it is possible to include the UE 100 into the coverage of the neighboring cell #1 by power up of the neighboring cell #1.

As shown in FIG. 9, the communication control method according to the embodiment further comprises the steps of: notifying, by the server 400, the eNB 200-1 of power control information indicating the decided amount of increase in transmission power of the neighboring cell #1; and increasing, by the eNB 200-1 that has received the power control information, the transmission power of the neighboring cell #1 on the basis of the received power control information.

Furthermore, the communication control method according to the embodiment further comprises the steps of: notifying, by the server 400, the eNB 200-1 of information indicating a power up time that is the time at which the neighboring cell #1 is to increase the transmission power; and notifying, by the server 400, the eNB 200-2 of information indicating an OFF time that is the time at which the OFF target cell #2 is to be set to the OFF state. This enables the server 400 to designate the power up time and the OFF time.

In the embodiment, the power up time and the OFF time are set to approximately the same time. As described above, the neighboring cell #1 and the OFF target cell #2 belong to the same frequency, and therefore, when the power up time is earlier than the OFF time, the neighboring cell #1 may give strong interference to the OFF target cell #2. On the other hand, when the power up time is later than the OFF time, communication interruption may occur in the UE 100 connected to the OFF target cell #2. Thus, it is desirable to set the power up time and the OFF time to approximately the same time.

The communication control method according to the embodiment further comprises the steps of: increasing, by the eNB 200-1, the transmission power of the neighboring cell #1 at a power up time; setting, by the eNB 200-2, the OFF target cell #2 to an OFF state at an OFF time; and performing, by the UE 100 connected to the OFF target cell #2, handover from the OFF target cell #2 to the neighboring cell #1. As a result, the UE 100 connected to the OFF target cell #2 is switched to connect to the extended neighboring cell #1, and thus, it is possible to avoid communication interruption in the UE 100.

(Specific Example of Operation According to Embodiment)

Figure 10:
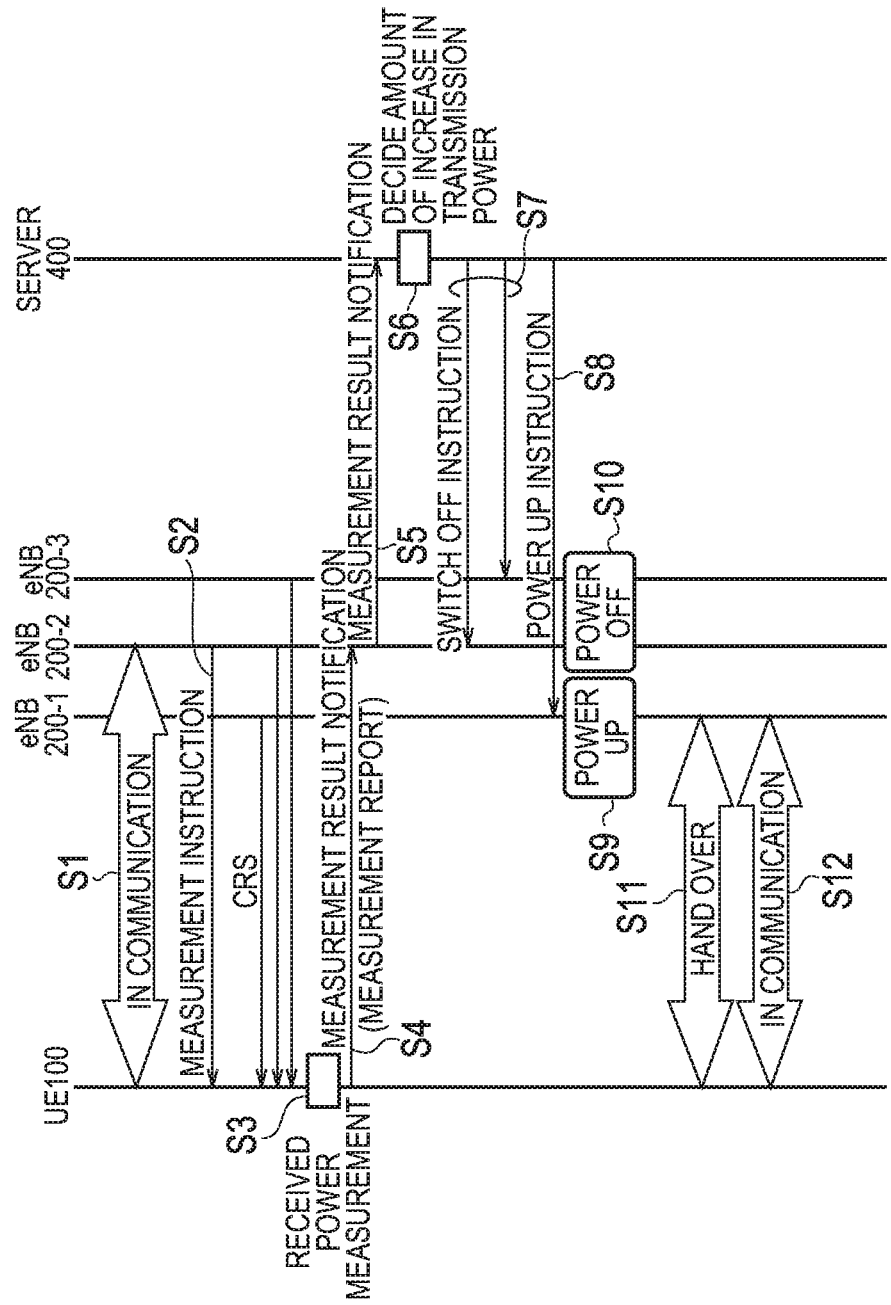
FIG. 10 is an operation sequence diagram according to the embodiment.

FIG. 10 is an operation sequence diagram according to the embodiment.

As shown in FIG. 10, in step S1, the UE 100 establishes a connection with the eNB 200-2 (cell #2) to perform communication.

In step S2, the eNB 200-2 transmits, to the UE 100, measurement instruction information for instructing transmission of a measurement report.

In step S3, the UE 100 performs, on the basis of the measurement instruction information, received power measurement of reference signals (RSs) received from each of the eNB 200-1 (cell #1), the eNB 200-2 (cell #2), and the eNB 200-3 (cell #3).

In step S4, the UE 100 transmits, to the eNB 200-2, a measurement report including a measurement result.

In step S5, the eNB 200-2 that has received the measurement report transmits (transfers) the received measurement report to the server 400.

In step S6, the server 400 that has received the measurement report decides, on the basis of the received measurement report, the amount of increase in transmission power of the eNB 200-1 (cell #1). Details of the processing will be described later.

In step S7, the server 400 transmits an OFF (Switch Off) instruction to each of the eNB 200-2 and the eNB 200-3. The OFF instruction includes information indicating the OFF time. The information indicating the OFF time is not limited to information indicating the OFF time directly, and may be information indicating the OFF time indirectly. The information indicating the OFF time indirectly is a timer value indicating an elapsed time from the reception of the OFF instruction to OFF execution, for example. Such a timer value makes it possible to designate the OFF time even when the eNB 200 is not time-synchronous.

In step S8, the server 400 transmits, to the eNB 200-1, a power up instruction. The power up instruction includes information indicating an amount of increase in transmission power and the information indicating a power up time. When the server 400 recognizes the transmission power of the eNB 200-1 (cell #1), the transmission power of the eNB 200-1 (cell #1) may be designated directly. The information indicating the power up time is not limited to information indicating the power up time directly, and may be information indicating the power up time indirectly. The information indicating the power up time indirectly is a timer value indicating an elapsed time from the reception of the power up instruction to power up execution, for example. Such a timer value makes it possible to designate the power up time even when the eNB 200 is not time-synchronous.

In step S9, the eNB 200-1 that has received the power up instruction increases the transmission power of the cell #1 on the basis of the power up instruction. Specifically, the eNB 200-1 increases the transmission power of the cell #1 by the amount of increase designated in accordance with the power up instruction, at the power up time designated in the power up instruction.

In step S10, the eNB 200-2 and the eNB 200-3 that has received the OFF instruction set the cell #2 and the cell #3 to the OFF state on the basis of the OFF instruction. Specifically, the eNB 200-2 and the eNB 200-3 set the cell #2 and the cell #3 to the OFF state, at the OFF time designated in the OFF instruction.

In step S11, the UE 100 performs handover from the eNB 200-2 (cell #2) to the eNB 200-1 (cell #1). For example, the handover may be performed by transmitting a handover instruction from the eNB 200-1 to the UE 100.

In step S12, the UE 100 establishes a connection with the eNB 200-1 (cell #1) to continue communication.

Next, details of the above-described step S6 will be described. FIG. 11 and FIG. 12 are diagrams for describing contents of processing in the server 400.

As shown in FIG. 11, the server 400 acquires measurement reports of each of a plurality of UEs 100 (UE-1, UE-2, . . . ) connected to either of the eNB 200-2 and the eNB 200-3. In an example of FIG. 11, the received power of every UE 100 for the eNB 200-1 performing cell extension is equal to or more than a threshold value, and thus, the server 400 determines that it is possible to include all of the UEs 100 into the coverage by the cell extension. When the received power for the eNB 200-1 performing the cell extension is within a predetermined range (for example, a range between −80 [dBm] and −100 [dBm]), the server 400 may determine to switch off and perform the power up.

Furthermore, the server 400 identifies a UE 100 (here, UE-1) which has the lowest received power for the eNB 200-1 performing the cell extension. When the transmission power is increased such that the received power of the UE-1 satisfies power requirements, it is possible to include all of the UEs 100 into the coverage by the cell extension.

As shown in FIG. 12, the server 400 holds in advance a table in which the lowest received power of the eNB 200-1 performing the cell extension and the amount of increase in transmission power of the eNB 200-1 performing the cell extension are associated. The amount of increase in transmission power in the table is set to a value such that the lowest received power meets power requirements (target value). In an example of FIG. 11, when focusing on the received power for the eNB 200-1, the received power in the UE-1 is the lowest and is −150 [dBm]. Thus, the server 400 decides 50 [dBm] corresponding to −150 [dBm] as the amount of increase in transmission power of the eNB 200-1, on the basis of the table shown in FIG. 12.

Figure 13:
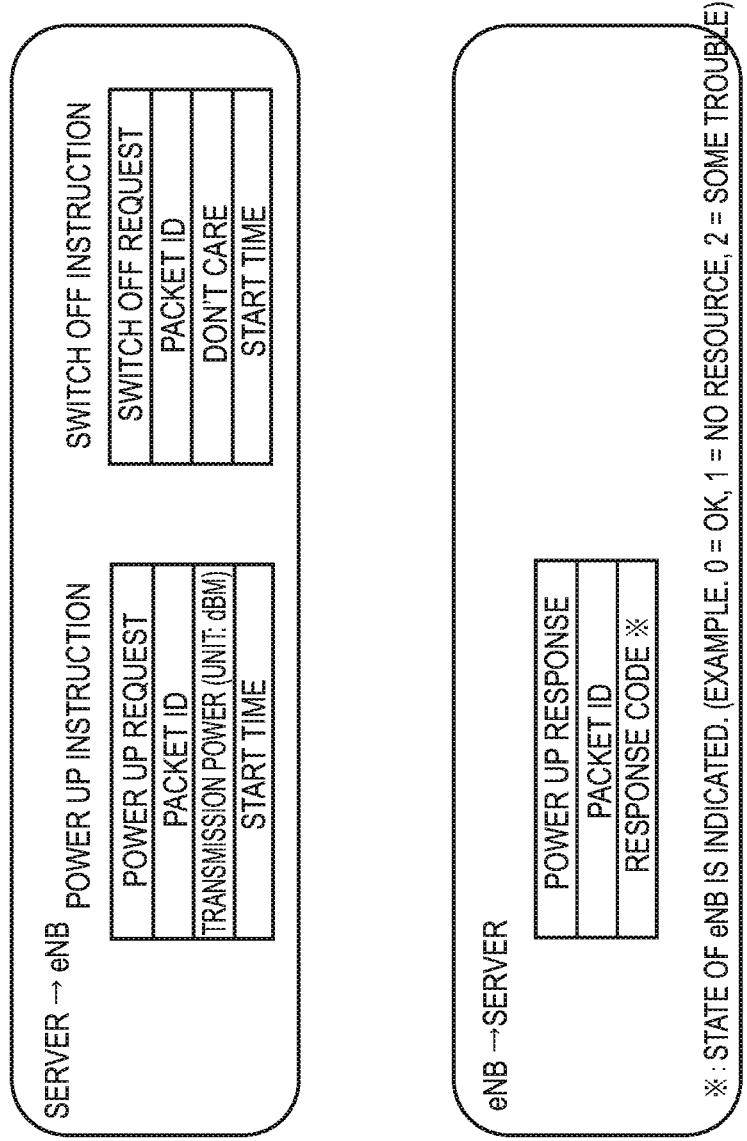
FIG. 13 is a diagram for describing a message configuration according to the embodiment.

Next, a message configuration used in the above-described operation sequence will be described. FIG. 13 is a diagram for describing the message configuration.

As shown in FIG. 13, a power up instruction transmitted from the server 400 to the eNB 200 includes information indicating an amount of increase in transmission power and information indicating a power up time. The power up instruction may further include a packet ID. The eNB 200 that has received the power up instruction may transmit a power up response to the server 400. The power up response includes information indicating whether or not the power up is possible. The information may include a reason why the power up is not possible.

An OFF (Switch Off) instruction transmitted from the server 400 to the eNB 200 includes information indicating an OFF time. The OFF instruction may further include a packet ID.

Summary of Embodiment

As described above, the communication control method according to the embodiment comprises a step A of notifying, by the UE 100 connected to the OFF target cell #2, the OFF target cell #2 of the neighboring cell received power that is the received power of a radio signal from the neighboring cell #1; and a step B of deciding, by the server 400, on the basis of the acquired neighboring cell received power, the amount of increase in transmission power of the neighboring cell #1. As described above, by deciding the amount of increase in transmission power of the neighboring cell #1 in consideration of the reception state of the UE 100 connected to the OFF target cell #2, it is possible to set the amount of increase in transmission power of the neighboring cell #1 to an appropriate value. Thus, the neighboring cell #1 is capable of appropriately supplementing a coverage of the OFF target cell #2.

[Modification]

In the above-described embodiment, the operation environment is assumed in which the cell #1 to the cell #3 belong to the same frequency; however, there may be a cell that belongs to a frequency different from the frequency to which the cell #1 to the cell #3 belong. In this case, when there is a UE 100 not capable of being included into the coverage by cell extension of the OFF target cell #2, communication performed by the UE 100 may be continuously available, by causing handover to a cell of another frequency.

FIG. 14 is a diagram for describing a modification of the embodiment. As shown in FIG. 14, the received power of a UE-5 for the eNB 200-1 (cell #1) performing cell extension is less than a threshold value, and thus, the server 400 determines that it is not possible to include the UE-5 into the coverage by the cell extension. Furthermore, the received power for an eNB 200-4 of another frequency is equal to or more than a threshold value, and thus, the server 400 determines that the UE-5 is capable of establishing a connection to the eNB 200-4 of another frequency. In this case, the server 400 makes the communication performed by the UE-5 possible to be continued, by performing control to cause the UE-5 handover to the eNB 200-4.

Other Embodiments

In the above-described embodiment, an example is described in which the decision of an amount of increase in transmission power is performed in the server 400; however, the decision of an amount of increase in transmission power may be performed in the eNB 200. In this case, the eNB 200 corresponds to the network apparatus according to the present invention.

Furthermore, in the above-described embodiment, different eNBs 200 manage the plurality of cells; however, the same eNB 200 may manage the plurality of cells.

In the above-described each embodiment, the LTE system as one example of a mobile communication system is described; however, the present invention may be applied to a system other than the LTE system.

[Addition Statement 1]

A communication control method in which a neighboring cell supplements a coverage of an OFF target cell by increasing transmission power of the neighboring cell, when setting the OFF target cell to an OFF state, comprising:

a step A of acquiring, by a network apparatus, from a user terminal connected to the OFF target cell, neighboring cell received power that is received power of a radio signal from the neighboring cell; and a step B of deciding, by the network apparatus, on the basis of the neighboring cell received power, an amount of increase in transmission power of the neighboring cell.

[Addition Statement 2]

A network apparatus in which a neighboring cell supplements a coverage of an OFF target cell by increasing transmission power of the neighboring cell, when setting the OFF target cell to an OFF state, wherein acquiring neighboring cell received power notified from a user terminal connected to the OFF target cell via the OFF target cell, and deciding an amount of increase in transmission power of the neighboring cell on the basis of the acquired neighboring cell received power.

[Addition Statement 3]

A base station of which transmission power is allowed to increase, wherein an increase in the transmission power is based on neighboring cell received power of a user terminal connected to a cell other than a cell managed by the base station, and the neighboring cell received power includes received power of a radio signal from a cell managed by the base station.

CROSS REFERENCE

The entire content of Japanese Patent Application No. 2013-221804 (filed on Oct. 25, 2013) is incorporated in the present specification by reference.

INDUSTRIAL APPLICABILITY

The present invention is useful in a mobile communication filed.

The invention claimed is:

1. A communication control method in which a neighboring cell supplements a coverage of an OFF target cell by increasing transmission power of the neighboring cell, when setting the OFF target cell to an OFF state, comprising:
  a step A of acquiring, by a network apparatus, from a user terminal connected to the OFF target cell, neighboring cell received power that is received power of a radio signal from the neighboring cell; and
  a step B of deciding, by the network apparatus, on the basis of the neighboring cell received power, an amount of increase in transmission power of the neighboring cell.

2. The communication control method according to claim 1, wherein when a plurality of user terminals connect to the OFF target cell,
  in the step A, the network apparatus acquires the neighboring cell received power from each of the plurality of user terminals, and
  in the step B, the network apparatus decides, on the basis of the neighboring cell received power acquired for each of the plurality of user terminals, an amount of increase in transmission power of the neighboring cell such that all of the plurality of user terminals are included into a coverage of the neighboring cell.

3. The communication control method according to claim 1, wherein the neighboring cell is managed by a first base station,
  the OFF target cell is managed by a second base station, and
  the network apparatus is a server that is capable of performing communication with the first base station and the second base station.

4. The communication control method according to claim 3, further comprising the steps of:
  notifying, by the network apparatus, the first base station of power control information indicating the decided amount of increase in transmission power of the neighboring cell; and
  increasing, by the first base station that has received the power control information, transmission power of the neighboring cell on the basis of the received power control information.

5. The communication control method according to claim 3, further comprising the steps of:
  notifying, by the network apparatus, the first base station of information indicating a power up time that is the time at which the neighboring cell is to increase transmission power; and
  notifying, by the network apparatus, the second base station of information indicating an OFF time that is the time at which the OFF target cell is to be set to an OFF state.

6. The communication control method according to claim 5, wherein the OFF target cell and the neighboring cell belong to the same frequency, and
  the power up time and the OFF time are set to approximately the same time.

7. The communication control method according to claim 5, further comprising the steps of:
  increasing, by the first base station, transmission power of the neighboring cell at the power up time;
  setting, by the second base station, the OFF target cell to an OFF state at the OFF time; and
  performing, by the user terminal connected to the OFF target cell, handover from the OFF target cell to the neighboring cell.

8. A network apparatus in which a neighboring cell, which neighbors an OFF target cell, supplements a coverage of the OFF target cell by increasing transmission power of the neighboring cell, when setting the OFF target cell to an OFF state, wherein
  the network apparatus
    acquires neighboring cell received power of a user terminal notified from a user terminal connected to the OFF target cell via the OFF target cell, and decides an amount of increase in transmission power of the neighboring cell on the basis of the acquired neighboring cell received power, and the neighboring cell received power is received power of a radio signal from the neighboring cell.

9. A base station of which transmission power is allowed to increase, wherein an increase in the transmission power is based on neighboring cell received power of a user terminal connected to a cell other than a cell managed by the base station, the neighboring cell received power includes received power of a radio signal from a cell managed by the base station, the neighboring cell neighbors the cell, and the neighboring cell received power is received power of a radio signal from the neighboring cell.

* * * * *